Aug. 21, 1928.
H. C. BIETTE
1,681,656
COFFEE PERCOLATOR
Filed Oct. 13, 1927
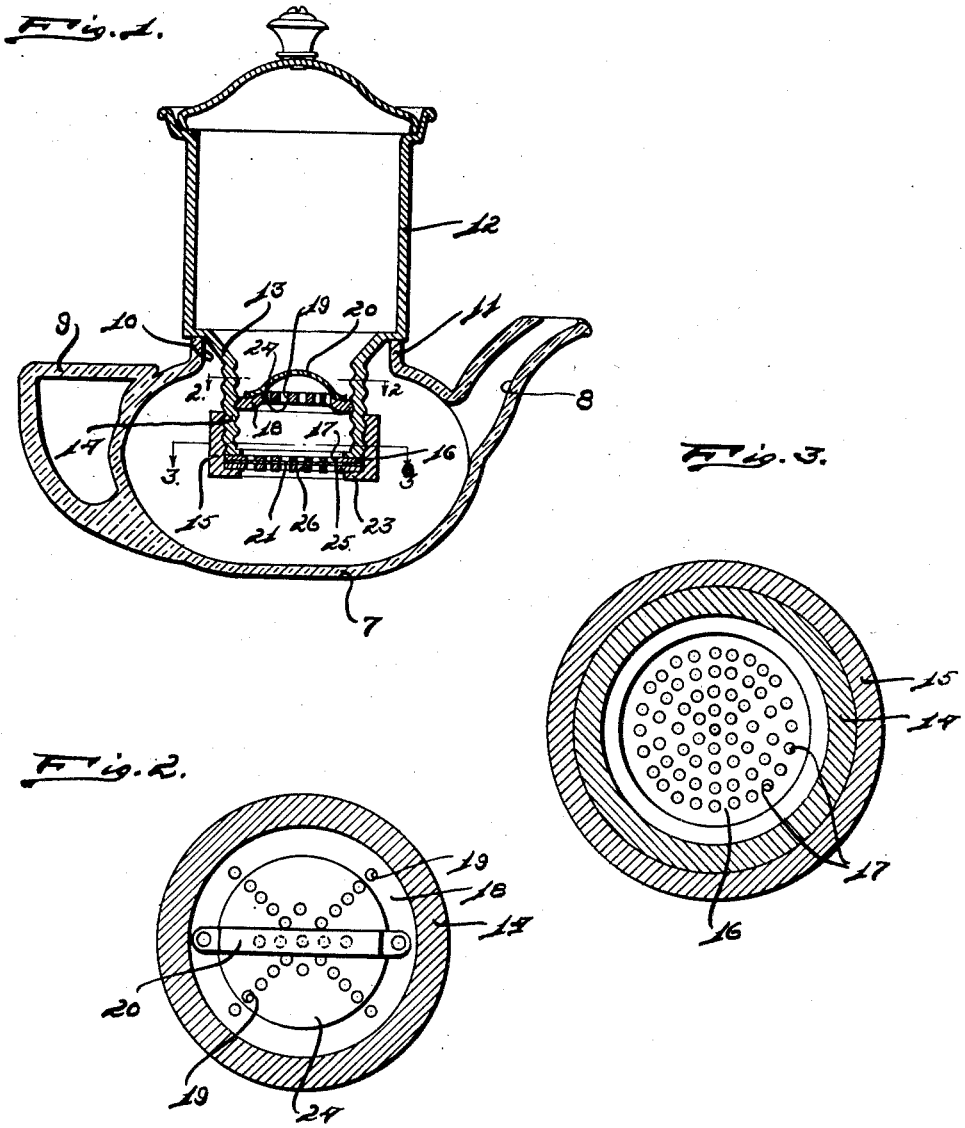
INVENTOR.
Henry C. Biette.
BY
Thos. L. Donnell
ATTORNEY.

Patented Aug. 21, 1928.                                           1,681,656

UNITED STATES PATENT OFFICE.

HENRY C. BIETTE, OF DETROIT, MICHIGAN, ASSIGNOR OF TWENTY PER CENT TO JOHN S. LONGTIN, OF WYANDOTTE, MICHIGAN, AND TEN PER CENT TO ERNEST C. SCHAFFER, OF DETROIT, MICHIGAN.

COFFEE PERCOLATOR.

Application filed October 13, 1927.  Serial No. 225,891.

My invention relates to a new and useful improvement in a coffee percolator, in which the coffee grounds are positioned below a container and the heated water placed above in the container and permitted to percolate or leach through the coffee grounds into a desired position below.

It is an object of the present invention to provide a coffee percolator of this class which will be simple in structure, economical of manufacture and highly efficient in use.

Another object of the invention is the provision of a coffee containing compartment in which the coffee grounds may be compressed as desired, so as to retard to the desired degree the seepage or leaching of the liquid therethrough.

It is another object of the invention to provide a device of this class which may be easily and quickly assembled and easily and quickly cleaned.

Another object of the invention is the provision in the compressing member of a chamber positioned above into which the coffee grounds may enter as they swell during the leaching of the liquid therethrough.

Another object of the invention is the provision of a percolator in which the juices of the coffee may be extracted without removal of the tannic acid therefrom.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention.

Fig. 2 is a sectional view taken on line 2—2 of Fig. 1.

Fig. 3 is a sectional view taken on line 3—3 of Fig. 1.

In the drawings I have illustrated the invention adapted for use with a lower container 7 having the pouring spout 8 and a handle 9 mounted thereon, the upper end 10 being open and provided with an upwardly projecting neck forming flange 11. An upper container 12 is positioned above the container 7, having its base flared as at 13 to provide shoulders which engage the upper edge of the flange or neck 11. A neck 14 extends outwardly from the flared base 13 and is interiorly and exteriorly threaded. A disc 16 in which perforations 17 are formed is placed in engagement with the lower edge of the neck 14 and the inwardly directed flange 23 which is formed on the neck. Engaging the undersurface of the disc 16 is a filter 21 which is formed from a layer of fabric or other suitable filtering material. A disc 25 is arranged to engage the undersurface of the filter 21, this disc 25 being provided with perforations 26. The inwardly directed flange 23 on the ring 15 serves to clamp the two discs and the filter in assembled position on the lower end of the neck 14. The ring 15 is threaded on the neck 14 and provided with the inwardly directed flange 23 which serves to bear against the undersurface of the disc 25 in the clamping operation.

When the coffee grounds of the desired amount have been placed in the neck 14, the disc 18, which serves as a cover and which is provided with perforations 19 and the handle 20, may be threaded downwardly so as to compress the grounds against the disc 16, the degree of compressing of the grounds regulating the rapidity of the seepage or leaching of the liquid therethrough, which is placed in the container 12.

As shown in Fig. 1, the disc 18 is formed concave at its center 24 to provide a space into which the coffee grounds may enter when the swelling of the same takes place as the percolating or leaching continues.

In operation, the desired amount of coffee is placed in the neck 14 and compressed the desired degree against the disc 16. The proper amount of boiling water is then placed in the container 12 and permitted to seep or leach through the coffee into the lower container 7, upon which the coffee is ready for use.

Coffee made in this manner is proven to be most palatable, free from injurious ingredients and particularly free from tannic acid.

Furthermore, there is, from the cheaper grades of coffee, produced a coffee which is possessed of a most desirable flavor.

While I have illustrated and described the preferred form of my invention, I do not wish to limit myself to the precise details of structure shown, but desire to avail myself of such variations and modifications as come within the scope of the appended claim.

Having thus described my invention what I claim as new and desire to secure by Letters Patent is:

A coffee percolator of the class described, comprising: a lower container having its upper end open and provided with an upwardly directed flange around said opening; an upper container; an inwardly flared base on said container, inwardly of the marginal edges thereof, to provide a shoulder for engaging the upper edge of said flange; an interiorly and exteriorly threaded neck depending centrally from said base and extending into said lower container; an inwardly directed flange on the lower end of said neck; a ring threadable on the exterior of said neck; an inwardly directed flange on the lower end of said ring; a filter member engaging the lower end of said neck; a perforated disc engaging the undersurface of said filter, the inwardly directed flange on said ring retaining said perforated disc and said filter in engagement with the lower end of said neck; and a perforated disc threadable into said neck for compressing coffee therein against said filter and disc, said threadable perforated disc having a concave center.

In testimony whereof I have signed the foregoing specification.

HENRY C. BIETTE.